(No Model.)
C. D. FOX.
RIDING ATTACHMENT FOR PLOWS, HARROWS, &c.
No. 485,184. Patented Nov. 1, 1892.
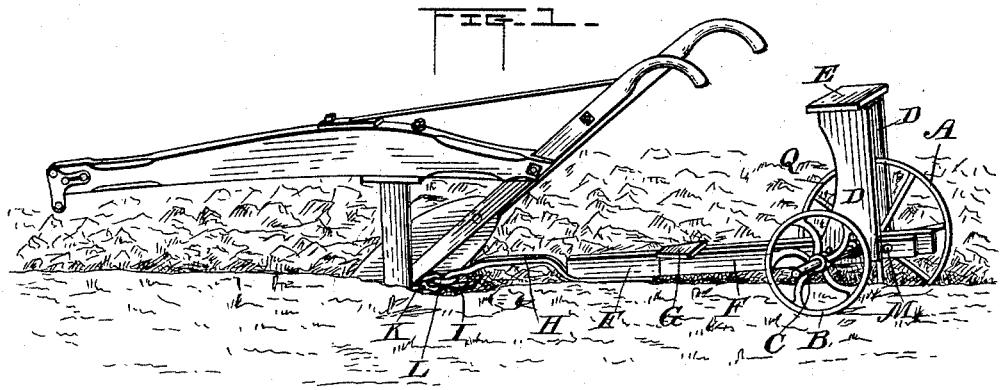
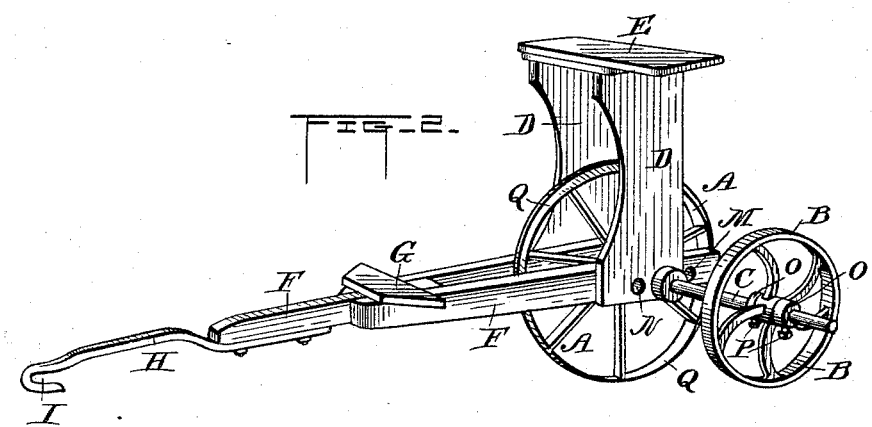
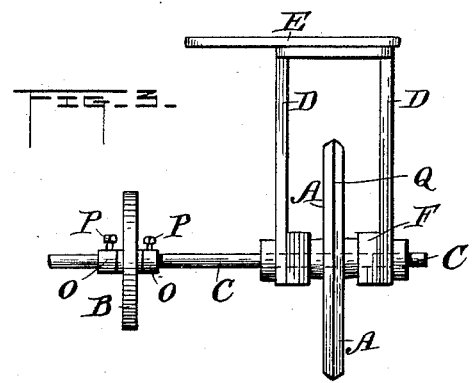
Witnesses
Severance
Ralph Daskam.
Inventor
Cyrus D. Fox,
By John Wedderburn,
Attorney

UNITED STATES PATENT OFFICE.

CYRUS D. FOX, OF ROSCOE, ILLINOIS.

RIDING ATTACHMENT FOR PLOWS, HARROWS, &c.

SPECIFICATION forming part of Letters Patent No. 485,184, dated November 1, 1892.

Application filed May 23, 1892. Serial No. 434,009. (No model.)

*To all whom it may concern:*

Be it known that I, CYRUS D. FOX, of Roscoe, in the county of Winnebago and State of Illinois, have invented certain new and useful Improvements in Riding Attachments for Plows, Harrows, &c.; and I do hereby declare the following to be a full, clear, and exact description of the invention, such as will enable others skilled in the art to which it appertains to make and use the same.

My invention relates to a riding attachment for plows, harrows, &c., the object of my invention being to provide a seat for the plowman which may be readily attached to and detached from the plow or harrow, as required, and which shall be an easy, convenient, and cheap riding attachment and at a mere nominal tax on the team; and my invention more especially resides in the novel construction, combination, and arrangement of parts hereinafter fully specified, and pointed out in the claims.

In the accompanying drawings, Figure 1 is a perspective view of the attachment in use with a plow. Fig. 2 is a similar view showing it disconnected therefrom, and Fig. 3 is an end elevation thereof.

The riding attachment or car when in use with a plow is mounted on two wheels of unequal diameter, of which the larger one A runs in the furrow made by the plow, while the smaller one B runs upon the land side. The wheels A and B turn freely upon a shaft C, upon which are also supported the standards D for the seat E and the forked frame F, which carries the foot-rest G, and to which is bolted or otherwise firmly secured the reach H. This reach terminates at its forward end in a hook I for attaching the car to the lower brace K in the plow.

In fastening the plow I use a hook and link L, which is first hooked to the cross-brace K, and then the reach is hooked to the link, making a joint for convenience in turning. A loop of small rope will also answer the purpose.

The frame F is provided with several bearing-holes M and the standards D with similar bearing-holes N to receive the shaft C, permitting of adjustment of the seat and wheels forward or backward.

To provide for lateral adjustment of the wheels and framework I use collars O and set-screws P for securing the collars in position on the shaft. The felly Q of the larger wheel is V-shaped in cross-section with the apex outward to prevent loading down with dirt, and also to keep it from jolting over the lumps that may fall in the furrow.

The same car is used as a riding attachment to a harrow by substituting a larger wheel for the smaller one and a longer reach and connecting the same with the evener of the harrow.

Having thus fully described my invention, what I claim, and desire to secure by Letters Patent, is—

1. In an apparatus of the class described, the combination of a shaft, a large and small wheel mounted thereon, a forked frame embracing the larger wheel and supported by the shaft, and a seat carried by the shaft over the larger wheel, and means for securing the wheels and frame at any desired position on the shaft, substantially as described.

2. In an apparatus of the class described, the combination of a shaft, a large and small wheel mounted thereon, a forked frame embracing the larger wheel and supported by the shaft, an upwardly-curved reach secured to said frame terminating in an attaching device, and a seat over the larger wheel, substantially as described.

In testimony whereof I have signed this specification in the presence of two subscribing witnesses.

CYRUS D. FOX.

Witnesses:
   B. B. COLLYER,
   F. F. LIVERMORE.